US012676316B2

(12) United States Patent
Yao

(10) Patent No.: US 12,676,316 B2
(45) Date of Patent: Jul. 7, 2026

(54) NEGATIVE ELECTRODE PLATE, BATTERY CELL, AND BATTERY

(71) Applicant: Ningde Amperex Technology Limited, Ningde (CN)

(72) Inventor: Meina Yao, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 535 days.

(21) Appl. No.: 18/332,142

(22) Filed: Jun. 9, 2023

(65) Prior Publication Data

US 2023/0402615 A1     Dec. 14, 2023

(30) Foreign Application Priority Data

Jun. 10, 2022     (CN) .......................... 202210650000.0

(51) Int. Cl.
*H01M 4/66*          (2006.01)
*H01M 4/02*          (2006.01)
*H01M 4/133*         (2010.01)
*H01M 4/587*         (2010.01)

(52) U.S. Cl.
CPC ........... *H01M 4/663* (2013.01); *H01M 4/133* (2013.01); *H01M 4/587* (2013.01); *H01M 2004/027* (2013.01)

(58) Field of Classification Search
CPC .................................................. H01M 4/633
See application file for complete search history.

(56) References Cited

U.S. PATENT DOCUMENTS

2023/0146812 A1*   5/2023   Lv ......................... H01M 4/663
                                                           429/209

FOREIGN PATENT DOCUMENTS

CN         106953076 B      7/2019
CN         108821275 B      11/2021
CN         108840331 B      11/2021

OTHER PUBLICATIONS

Official Action 1 for copending application CN 202210650000.0 mailed Jul. 19, 2022.
Notice of Allowance for copending application CN 202210650000.0 mailed Jul. 22, 2022.

* cited by examiner

*Primary Examiner* — Brian R Ohara
(74) *Attorney, Agent, or Firm* — XSENSUS LLP

(57)                ABSTRACT

A negative electrode plate includes: a negative current collector; a first negative active material layer close to the negative current collector and disposed on at least one surface of the negative current collector, where the first negative active material layer includes a first negative active material; and a second negative active material layer. The second negative active material layer includes a second negative active material. The first negative active material layer is located between the second negative active material layer and the negative current collector. An interlayer spacing of the first negative active material is smaller than an interlayer spacing of the second negative active material.

14 Claims, 1 Drawing Sheet

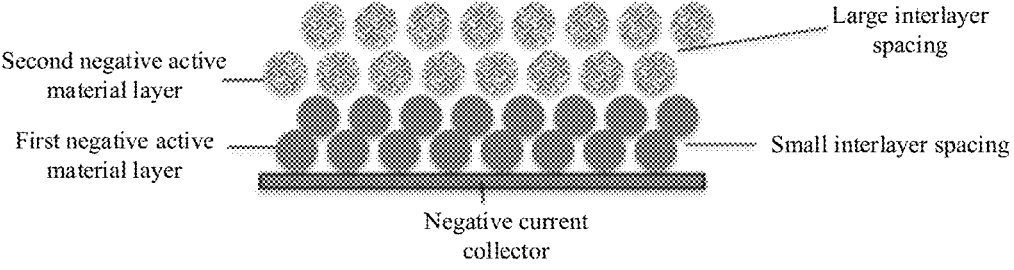
Second negative active material layer
First negative active material layer
Large interlayer spacing
Small interlayer spacing
Negative current collector

NEGATIVE ELECTRODE PLATE, BATTERY CELL, AND BATTERY

CROSS REFERENCE TO THE RELATED APPLICATIONS

This application claims priority from Chinese Patent Application No. 202210650000.0, filed on Jun. 10, 2022, the entire contents of which are incorporated herein by reference in its entirety.

TECHNICAL FIELD

This application relates to the technical field of energy storage devices, and in particular, to a negative electrode plate, a battery cell, and a battery.

BACKGROUND

Compared with other types of batteries such as lead-acid batteries, a lithium-ion battery exhibits the advantages of a high energy density, a long cycle life, a low self-discharge rate, and environmental protection and no pollution, and has been widely used in the fields such as aviation, aerospace, marine navigation, and electric vehicles. With advantages such as a low voltage platform and high electrical conductivity, graphite is currently a mainstream negative electrode material of lithium-ion batteries. However, with the rapid development of lithium-ion batteries, the conventional graphite negative electrode can hardly meet the requirements in terms of high cycle-performance and a high rate of batteries.

Research by Yang Shaobin et al. (*Influences of Increasing Interlayer Spacing on the Properties of Lithium Storage of Natural Graphite*, by Yang Shaobin, Fei Xiaofei, Jiang Na; *Acta Chemical Sinica,* 2009, 69(17): 1995-2000) shows that a negative electrode material with a relatively large interlayer spacing in a lithium-ion battery can significantly enhance the rate discharge performance and cycle performance of the battery. CN108840331A has disclosed a large-interlayer-spacing artificial graphite material and a preparation method thereof. The material achieves excellent electrical conductivity, long-term cycle stability, and high rate performance. Evidently, a relatively large interlayer spacing can improve the cycle performance and rate performance of the battery. However, the compacted density of the graphite with a large interlayer spacing is relatively low, thereby causing a volumetric energy density loss to the battery.

SUMMARY

Some embodiments of this application provide a negative electrode plate, a battery cell, and a battery to enhance cycle performance and rate performance of the battery while achieving a relatively high capacity of the battery, and also improve the anti-swelling performance and kinetics of the battery to some extent.

First, some embodiments of this application provides a negative electrode plate, including: a negative current collector, a first negative active material layer, and a second negative active material layer. In a thickness direction of the negative electrode plate, the first negative active material layer is located between the second negative active material layer and the negative current collector. The first negative active material layer includes a first negative active material. The second negative active material layer includes a second negative active material. An interlayer spacing of the first negative active material is smaller than an interlayer spacing of the second negative active material. The interlayer spacing of the first negative active material in the first negative active material layer close to the negative current collector is caused to be smaller than the interlayer spacing of the second negative active material in the second negative active material layer away from the negative current collector, so that the second negative active material located on a relatively outer side of the electrode plate and possessing a large interlayer spacing makes it easier to deintercalate ions such as lithium ions and sodium ions, thereby improving the cycle performance and rate performance of the battery. The first negative active material located on a relatively inner side of the electrode plate (that is, closer to the current collector than the second negative active material layer) and possessing a small interlayer spacing is of a high energy density and can be used to compensate for the capacity loss caused by the large interlayer spacing. The negative active material layer located on a relatively outer side and possessing a large interlayer spacing coordinates with the negative active material layer located on a relatively inner side and possessing a small interlayer spacing to enhance the cycle performance and rate performance without losing the capacity of the battery.

A ratio of the interlayer spacing of the second negative active material to the interlayer spacing of the first negative active material falls within a range of 1.1 to 1.8. If the interlayer spacing ratio is too low, for example, greater than or equal to 1 but less than 1.1, the difference between the first negative active material and the second negative active material is small. The cycle performance, rate performance, and compensation for capacity loss can be improved to some extent, but the degree of improvement is limited. In addition, the special tab structure involves additional steps such as material preparation and coating, thereby increasing the production cost and impairing the input-output ratio. When the above interlayer spacing ratio is less than 1, that is, when the interlayer spacing of the second negative active material located on the relatively outer side is smaller than the interlayer spacing of the first negative active material located on the relatively inner side, the negative active material located on the relatively outer side and possessing a small interlayer spacing is detrimental to the deintercalation of the ions such as lithium ions or sodium ions, and hinders the intercalation of lithium ions or sodium ions into the negative active material located on a relatively inner layer and possessing a large interlayer spacing, or hinders the deintercalation of lithium ions or sodium ions out of the negative active material located on a relatively inner side. Consequently, the negative active material possessing a relatively large interlayer spacing is unable to exert the effect of improving the cycle performance and rate performance. When the interlayer spacing ratio is excessive, for example, greater than 1.8, the interlayer spacing of the first negative active material is deficient or the interlayer spacing of the second negative active material is excessive, thereby impairing the cycle performance, rate performance, or energy density of the battery.

Preferably, the interlayer spacing ratio falls within a range of 1.1 to 1.3. With the interlayer spacing ratio falling within such a range, the difference between the interlayer spacing of the first negative active material and the interlayer spacing of the second negative active material is reasonable. Therefore, severe volume swelling and poor cycle performance or rate performance of the electrode plate will not be caused by a small interlayer spacing of the first negative active material during cycling, and a severe decrease in the energy density will not be caused by a large interlayer spacing of the second negative active material, thereby achieving an optimal trade-off between the energy density, cycle performance, and rate performance of the battery.

A value range of the interlayer spacing of the first negative active material is 0.34 nm to 0.42 nm; and a value range of the interlayer spacing of the second negative active material is 0.37 nm to 0.61 nm. The interlayer spacing of the first negative active material is preferably 0.34 nm to 0.37 nm, and the interlayer spacing of the second negative active material is preferably 0.37 nm to 0.45 nm. The interlayer spacing falling within such preferred ranges ensures a high energy density in addition to high cycle performance, high rate performance, and high anti-swelling performance.

The negative current collector is coated with an undercoat layer, so as to increase the bonding force between the negative active material and the current collector and prevent the negative electrode from falling off the current collector after swelling in an ion deintercalation process. Preferably, the undercoat layer includes at least one of conductive carbon, carbon nanotubes, or graphene. Such undercoat layer materials can also improve conductivity of the electrode plate.

The first negative active material and the second negative active material each are any one independently selected from a group of soft carbon, hard carbon, artificial graphite and natural graphite.

In addition, an embodiment of this application provides a battery cell. The battery cell includes any one of the negative electrode plates described above.

Finally, an embodiment of this application provides a battery. The battery includes any one of the battery cells described above.

The technical solutions provided in some embodiments of this application bring at least the following beneficial effects:

This application discloses a negative electrode plate that includes two active material layers: a first negative active material layer close to the negative current collector and a second negative active material layer away from the negative current collector. The second negative active material in the second negative active material layer possesses a large interlayer spacing, and is configured to improve the cycle performance and rate performance of the battery. The first negative active material in the first negative active material layer possesses a small interlayer spacing, and is configured to compensate for the volumetric energy density loss of the battery caused by the large interlayer spacing. The two negative active material layers coordinate with each other to enhance the cycle performance and rate performance of the battery effectively without losing the volumetric energy density, and also improve the anti-swelling performance and kinetics to some extent.

BRIEF DESCRIPTION OF DRAWINGS

To describe the technical solutions in some embodiments of this application or the prior art more clearly, the following outlines the drawings to be used in the description of some embodiments of this application or the prior art. Evidently, the drawings outlined below are merely a part of embodiments of this application. A person skilled in the art may derive other drawings from such drawings without making any creative effort.

FIGURE is a schematic structural diagram of a negative electrode plate according to an embodiment of this application.

DETAILED DESCRIPTION

To make the objectives, technical solutions, and advantages of this application clearer, the following describes this application in further detail with reference to drawings and embodiments. Understandably, the specific embodiments described herein are merely intended to explain this application, but are not intended to limit this application.

For brevity, just some of numerical ranges are expressly disclosed herein. However, any lower limit may be combined with any upper limit to form an unspecified range, any lower limit may be combined with any other lower limit to form an unspecified range, and any upper limit may be combined with any other upper limit to form an unspecified range. In addition, although not explicitly stated, any point and any single numerical value between end points of a range are included in the range. Therefore, each point or each single numerical value may be used as a lower limit or upper limit of the range to combine with any other point or other single numerical value or with any other lower or upper limit to form an unspecified range.

In the embodiments and claims, a list of items referred to by using the terms such as "at least one of", "at least one thereof", "at least one type of" or other similar terms may mean any combination of the listed items. For example, if items A and B are listed, the phrases "at least one of A and B" and "at least one of A or B" mean: A alone; B alone; or both A and B. In another example, if items A, B, and C are listed, the phrases "at least one of A, B, and C" and "at least one of A, B, or C" mean: A alone; B alone; C alone; A and B (excluding C); A and C (excluding B); B and C (excluding A); or all of A, B, and C.

"Interlayer spacing" means a distance between layers. For example, graphite is a structure of a planar hexagonal lattice generated by arranging three covalent single bonds that are formed by a $sp^2$ hybridized orbital and three neighboring carbon atoms. The carbon atoms in the lattice are stacked into planes parallel to each other by the van-der-Waals force to form a layered sheet structure, with a distance between layers referred to as an interlayer spacing, denoted as $d_{002}$. The interlayer spacing satisfies: $d_{002}=d=n\lambda/2 \sin\theta$ ($n=1, 2, 3$, and so on), where n represents the order of diffraction, $\lambda$ represents a wavelength of the X-ray in use, and $\theta$ represents an angle between a diffracted beam and an incident ray. An interlayer space is not only a storage space for lithium ions, but also a solid phase diffusion channel for lithium ions. Increasing the interlayer spacing of graphite is not only conducive to diffusing the lithium ions, reducing the impedance, improving the kinetics, but also conducive to reducing an activation potential and electrode swelling of a lithium-ion battery during first-cycle charging, and improving the charge-and-discharge performance of the battery cycled at a specified rate.

The interlayer spacing may be determined by the following method: disassembling a battery cell, and selecting an electrode plate with a smooth surface to which the active material remains attached; soaking the electrode plate in DMC and cleaning it until the electrolytic solution is cleaned off, and then drying the electrode plate; subsequently, punching the electrode plate into small discs as specimens with a diameter of 14 mm; scanning the cross-sectional area of the specimen to identify an upper-layer film and a lower-layer film of the specimen, and thickness thereof;

separating the upper-layer film apart from the lower-layer film based on the thicknesses, and then grinding the specimen into conventional powder, with the specimen mass being greater than or equal to 2 grams; adding fine silicon powder into the graphite specimen at a ratio of C:Si=5:1, and mixing well to generate an internal standard substance containing 1 gram of graphite and 0.2 gram of silicon; and then performing an XRD test to obtain the parameter values of n, $\lambda$, and $\theta$ of the upper and lower films, and substituting the parameter values into the corresponding formula to obtain the interlayer spacing $d_{002}$.

"Interlayer spacing ratio" means a ratio of the interlayer spacing of the second negative active material (the interlayer spacing of the upper-layer material) to the interlayer spacing of the first negative active material (the interlayer spacing of the lower-layer material), and is obtained by dividing the interlayer spacing of the upper-layer material by the interlayer spacing of the lower-layer material.

"Irreversible capacity" means a capacity of a battery cell that is made irreversible by the loss of active materials caused by electrochemical side reactions such as electrolyte decomposition, active material dissolution, and metal lithium deposition during the cycling of the battery cell.

"Rated capacity" means a capacity that can be provided by the battery by discharging the battery under an ambient temperature of 20±5° C. until the voltage reaches a cut-off voltage in 5 h, measured in ampere hours (Ah) or milliampere hours (mAh).

"Capacity retention rate" at the end of a specified number of cycles means a ratio of a cycle capacity at the end of such number of cycles to an initial cycle capacity, where the cycle capacity is a capacity that can be released by a battery discharged at a rate of 1.0 C during charge-and-discharge cycles, and keeps decreasing with the increase of the number of charge-and-discharge cycles. The cycle capacity at the end of the $3^{rd}$ to $4^{th}$ cycle is usually used as the initial cycle capacity.

"Rate performance" means charge-and-discharge rate performance, and is used to represent the charge-and-discharge capabilities of a battery. The lower the impedance of a battery cell, the higher the corresponding rate performance.

"Cell swelling rate" at the end of a specified number of cycles means a ratio of a thickness of a battery cell at the end of such number of cycles to a cell initial thickness when the battery keeps swelling in thickness during charging and discharging. The cell thickness at the end of the $3^{rd}$ to $4^{th}$ cycle is usually used as the initial cell thickness.

"Volumetric energy density" means a ratio of initial charging energy or initial discharging energy of a battery cell to a volume of the battery cell as tested by a specified method under specified conditions.

"Active mass density of a negative electrode plate" means a compacted density of graphite, calculated as: compacted density=coating weight of an active material/volume of the active material.

A structure of a battery used in an embodiment of this application is as follows: A positive electrode of the battery is made of an aluminum foil that is 9 to 15 μm thick; the material of a positive electrode film is lithium cobalt oxide (LiCoO$_2$); a negative electrode is made of a copper foil that is 4 to 15 μm thick; the thickness of a first negative active material layer is the same as the thickness of a second negative active material layer; a second negative active material is normally available artificial graphite/natural graphite; a first negative active material is also normally available artificial graphite/natural graphite; a substrate of the separator is made of PP+PE, coated with a ceramic layer and an adhesive layer; a tab of the positive electrode is made of aluminum, and a tab of the negative electrode is made of nickel.

Negative Electrode Plate

A first aspect in an embodiment of this application provides a negative electrode plate. The negative electrode plate includes a negative current collector, a first negative active material layer, and a second negative active material layer. In a thickness direction of the negative electrode plate, the first negative active material layer is located between the second negative active material layer and the negative current collector. The first negative active material layer includes a first negative active material. The second negative active material layer includes a second negative active material. An interlayer spacing of the first negative active material is smaller than an interlayer spacing of the second negative active material. The first negative active material layer is also called a lower-layer film. The second negative active material layer is also called an upper-layer film.

The negative electrode plate disclosed in this embodiment of this application is a double-layered structure that includes two negative active material layers: a first negative active material layer (lower-layer film) close to the negative current collector and a second negative active material layer (upper-layer film) away from the negative current collector. The second negative active material in the second negative active material layer possesses a large interlayer spacing, and is configured to improve the cycle performance and rate performance of the battery. The first negative active material in the first negative active material layer possesses a small interlayer spacing, and is configured to compensate for the volume loss caused by the large interlayer spacing. The upper-layer film with a large interlayer spacing coordinates with the lower-layer film with a small interlayer spacing to enhance the cycle performance and rate performance of the battery without losing the capacity of the battery.

In some exemplary embodiments, a ratio of the interlayer spacing of the second negative active material to the interlayer spacing of the first negative active material falls within a range of 1.1 to 1.8.

As an example, the ratio of the interlayer spacing of the second negative active material to the interlayer spacing of the first negative active material falls within a range formed by any two of 1.1, 1.2, 1.4, 1.6, or 1.8.

By adjusting the interlayer spacing ratio, the ratio of the interlayer spacing of the second negative active material to the interlayer spacing of the first negative active material is controlled to fall within a range of 1.1 to 1.8, thereby significantly enhancing the cycle performance and rate performance of the battery and also improving the anti-swelling performance and kinetics to some extent.

Preferably, the ratio of the interlayer spacing of the second negative active material to the interlayer spacing of the first negative active material falls within a range of 1.1 to 1.3.

Specifically, the ratio of the interlayer spacing of the second negative active material to the interlayer spacing of the first negative active material falls within a range formed by any two of 1.1, 1.15, 1.2, 1.25, or 1.3.

The interlayer spacing ratio is further controlled to fall within a range of 1.1 to 1.3 so that the cycle life, rate performance, anti-swelling performance, and kinetics of the battery cell reach optimum without loss of capacity of the battery cell.

The value range of the interlayer spacing of the second negative active material is 0.37 nm to 0.61 nm.

As an example, the interlayer spacing of the second negative active material falls within a range formed by any two of 0.37 nm, 0.39 nm, 0.45 nm, 0.54 nm, 0.58 nm, 0.60 nm, or 0.61 nm.

The large interlayer spacing (0.37 nm to 0.61 nm) broadens the diffusion channel of lithium ions, makes it easier to deintercalate lithium ions from active sites in graphite, and reserves space for swelling. Therefore, in a first charge-and-discharge cycle of the battery, the activation potential is relatively low and the volume swelling is insignificant, thereby improving the cycle performance and rate capability significantly.

Preferably, the value range of the interlayer spacing of the second negative active material is 0.37 nm to 0.45 nm.

As an example, the interlayer spacing of the second negative active material falls within a range formed by any two of 0.37 nm, 0.39 nm, 0.42 nm, or 0.45 nm.

In some exemplary embodiments, the value range of the interlayer spacing of the first negative active material is 0.34 nm to 0.42 nm.

As an example, the interlayer spacing of the first negative active material falls within a range formed by any two of 0.34 nm, 0.36 nm, 0.38 nm, 0.40 nm, or 0.42 nm.

The small interlayer spacing (0.34 nm to 0.42 nm) compensates for the capacity loss of the battery caused by the large interlayer spacing (0.37 nm to 0.61 nm), and in turn, delays aging and improves the cycle performance of the battery cell.

Preferably, the value range of the interlayer spacing of the first negative active material is 0.34 nm to 0.37 nm.

As an example, the interlayer spacing of the first negative active material falls within a range formed by any two of 0.34 nm, 0.35 nm, 0.36 nm, or 0.37 nm.

The current collector is coated with an undercoat layer. Preferably, the undercoat layer includes at least one of conductive carbon, carbon nanotubes, or graphene.

In some exemplary embodiments, the first negative active material and the second negative active material each are any one independently selected from soft carbon, hard carbon, artificial graphite, or natural graphite. Such materials also improve kinetics significantly due to an excellent ion-conducting porous structure.

An exemplary method for preparing a negative electrode plate includes the following steps:

(1) Dissolving a first negative active material/a second negative active material, a binder, and a dispersant in a solvent at a specified weight ratio to form different negative slurries;

(2) Applying the negative slurry containing the first negative active material onto a negative current collector to form a first negative active material layer;

(3) Applying the negative slurry containing the second negative active material onto the first negative active material layer to form a second negative active material layer; and (4) Drying, cold-pressing, and cutting the negative current collector that is successively coated with the first negative active material layer and the second negative active material layer in step (3), so as to obtain a negative electrode plate coated with two active material layers.

Battery Cell

A second aspect of this application provides a battery cell. The battery cell includes a positive electrode plate, a separator, and a negative electrode plate.

The negative electrode plate is the negative electrode plate provided in the first aspect in an embodiment of this application.

The positive electrode plate includes a positive current collector and a positive active material layer applied onto at least one surface of the positive current collector. The positive active material in the positive active material layer may be one or more compounds selected from lithium cobalt oxide, lithium nickel oxide, lithium manganese oxide, lithium nickel manganese oxide, lithium nickel cobalt manganese oxide, lithium nickel cobalt aluminum oxide, or lithium iron phosphate, or a compound formed by adding another transition metal or non-transition metal into any one of such compounds.

As an example, the positive current collector may be made of a metal foil or a porous metal sheet or another material, for example, a foil or porous plate made of a metal such as aluminum, copper, nickel, titanium, or iron, or an alloy thereof, such as an aluminum foil.

The positive electrode plate may be prepared by a conventional method in this field.

The type of the separator is not limited, and may be selected according to actual needs. For example, the separator may be made of, but not limited to, polyethylene, polypropylene, polyvinylidene difluoride, or a multilayer composite thereof.

A battery cell may be obtained by stacking the positive electrode plate, the separator, and the negative electrode plate in sequence in such a way that the separator is located between the positive electrode plate and the negative electrode plate to serve a function of separation, or may be obtained by winding the stacked structure.

Battery

The bare cell is put into an outer package, filled with an electrolytic solution and sealed to obtain a battery.

The electrolytic solution includes an organic solvent, an electrolyte lithium salt, and an additive. The type of the organic solvent is not particularly limited herein, and may be selected according to actual needs.

As an example, the organic solvent may include one or more of, and preferably two or more of: ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), ethyl methyl sulfone (EMS), or (ethyl sulfonyl)ethane (ESE).

As an example, the electrolyte lithium salt includes one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluoro(oxalato)borate), LiBOB (lithium bis (oxalato)borate), $LiPO2F_2$ (lithium difluorophosphate), LiDFOP (lithium difluoro(bisoxalato)phosphate), or LiTFOP (lithium tetrafluoro(oxalato)phosphate).

Optionally, the electrolytic solution further includes an additive. The type of the additive is not particularly limited herein, and may be any additive suitable for use in a lithium-ion battery and may be selected according to actual needs. As an example, the additive may be one or more of vinylene carbonate (VC), vinyl ethylene carbonate (VEC), succinonitrile (SN), adiponitrile (ADN), 1,3-propene sultone (PST), sulfonate cyclic quaternary ammonium salt, tris(trimethylsilane)phosphate (TMSP), or tris(trimethylsilane)borate (TMSB).

The electrolytic solution may be prepared by a conventional method in this field.

It is hereby noted that because the reaction principles of a sodium-ion battery are similar to those of a lithium-ion battery, the negative electrode plate disclosed in this application is applicable to, but not limited to the use in, lithium-ion batteries and sodium-ion batteries.

EMBODIMENTS

The following embodiments are more detailed descriptions of the subject-matter disclosed herein. The embodiments are merely intended as illustrative descriptions because, evidently, a person skilled in the art may make various modifications and changes to such embodiments without departing from the disclosure hereof. Unless otherwise specified, all fractions, percentages, and ratios mentioned in the following embodiments are values by weight. All reagents used in the embodiments are commercially available or can be synthesized according to conventional methods, and can be directly put into use without a need of further processing. All the instruments used in the embodiments are commercially available.

Embodiment 1

Preparing a Positive Electrode Plate

Mixing the positive active material—lithium cobalt oxide active material $LiCoO_2$, conductive carbon black Super-P, and a binder PVDF at a weight ratio of 97.6:1.3:1.1 in an N-methyl-pyrrolidone NMP solvent system, and stirring the mixture well in a vacuum blender to obtain a positive slurry. Applying the positive slurry onto both surfaces of a 9 μm-thick aluminum foil substrate in an amount of 280 mg. Drying, cold pressing, slitting, and cutting the foil successively to obtain a positive electrode plate with a thickness of 95 μm and with an active mass density of 4.23 g/cc.

Preparing a Negative Electrode Plate

Both the first negative active material and the second negative active material are graphite. The interlayer spacing of the second negative active material is 0.61 nm, and the interlayer spacing of the first negative active material is 0.34 nm.

Dissolving the first negative active material, a binder styrene butadiene rubber, and a dispersant sodium carboxymethyl cellulose at a weight ratio of 97.5:1.2:1.3 in deionized water, and mixing well to obtain a negative slurry containing the first negative active material. Similarly, obtaining a negative slurry containing the second negative active material.

Applying the negative slurry containing the first negative active material onto one surface of a 6 μm-thick negative current collector copper foil in an amount of 76 mg to form a first negative active material layer.

Applying, after the first negative active material layer is dried, the negative slurry containing the second negative active material onto the first negative active material layer in an amount of 76 mg to form a second negative active material layer.

Drying, cold-pressing, and then cutting the negative current collector coated with the first negative active material layer and the second negative active material layer, so as to obtain a negative electrode plate coated with two active material layers. After the cold pressing, the thickness of the negative electrode plate is 117 μm.

Preparing an Electrolytic Solution

Mixing ethylene carbonate (EC) and ethyl methyl carbonate (EMC) at a volume ratio of 3:7 to obtain an organic solvent, and then dissolving a well-dried $LiPF_6$ lithium salt in the mixed organic solvent to obtain an electrolytic solution in which the lithium salt concentration is 1 mol/L.

Preparing a Separator

Using 8 μm-thick polyethylene (PE) as a substrate of the separator, and coating both sides of the substrate of the separator with a 2-μm thick aluminum oxide ceramic layer. Finally, applying polyvinylidene difluoride (PVDF) as a binder in an amount of 2.5 mg onto both sides that have been coated with a ceramic layer, and performing drying.

Preparing a Lithium-Ion Secondary Battery

Stacking the foregoing positive electrode plate, separator, and negative electrode plate in sequence in such a way that the separator is located between the positive electrode plate and the negative electrode plate to serve a function of separation. Winding the stacked structure to obtain a bare cell. Welding the qualified bare cell onto a top cover through a tab, and placing the bare cell in an outer package. Drying the bare cell in the package, and then injecting an electrolytic solution into the package. Performing steps such as vacuum packaging, static standing, chemical formation, and shaping to obtain a lithium-ion secondary battery.

Embodiments 2 to 5

The steps are similar to those in Embodiment 1 except that, in the preparation of the negative electrode plate, the interlayer spacing of the first negative active material and the interlayer spacing of the second negative active material are adjusted by adjusting the model or type of the material, so as to obtain the interlayer spacing ratios in Embodiments 2 to 5 shown in Table 1. For details, see Table 1.

Comparative Embodiment 1

The difference from Embodiment 1 is that the negative electrode plate includes just a single active material layer and is prepared by the following method:

Using graphite as an active material in the single active material layer, in which the interlayer spacing is 0.34 nm.

Mixing the negative active material graphite (interlayer spacing: 0.34 nm), a binder styrene-butadiene rubber, and a dispersant sodium carboxymethyl cellulose at a weight ratio of 97.5:1.2:1.3, and dissolving the mixture in deionized water to form negative slurry. Applying the negative slurry uniformly onto both surfaces of a 6 μm-thick negative current collector copper foil in an amount of 152 mg. Drying the slurry at a room temperature, and then moving the current collector into an oven for further drying. Cold-pressing and slitting the dried foil to obtain a negative electrode plate with a thickness of 114.6 μm.

Comparative Embodiment 2

The difference from Embodiment 1 is that the negative electrode plate includes just a single active material layer and is prepared by the following method:

Using graphite as an active material in the single active material layer, in which the interlayer spacing is 0.61 nm.

Mixing the negative active material graphite (interlayer spacing: 0.61 nm), a binder styrene-butadiene rubber, and a dispersant sodium carboxymethyl cellulose at a weight ratio of 97.5:1.2:1.3, and dissolving the mixture in deionized water to form negative slurry. Applying the negative slurry uniformly onto both surfaces of a 6 μm-thick negative current collector copper foil in an amount of 152 mg. Drying the slurry at a room temperature, and then moving the current collector into an oven for further drying. Cold-pressing and slitting the dried foil to obtain a negative electrode plate with a thickness of 119 μm.

Embodiments 6 to 7 and Comparative Embodiment 3

The steps are similar to those in Embodiment 1 except that, in the preparation of the negative electrode plate, the interlayer spacing of the first negative active material and the interlayer spacing of the second negative active material are adjusted, so as to obtain the interlayer spacing ratios in Embodiments 6 to 7 and Comparative Embodiment 3 shown discharge capacities of the battery discharged at different rates. Calculating the discharge capacity ratio of the battery discharged at different rates benchmarked against a 0.2 C discharge capacity.

(2) Testing the Cycle Performance

Charging the battery under a temperature of 25° C. at a constant current of 2 C until the voltage reaches 4.5 V, and then at a constant voltage until the current reaches 0.02 C. Leaving the battery to stand for 5 minutes, and then discharging the battery at a constant current of 0.7 C until the voltage reaches 3V, thereby completing one cycle. Repeating the foregoing steps for 1000 cycles. Recording the 1 C discharge capacity and the battery cell thickness at the end of the $1000^{th}$ cycle. Calculating a capacity retention rate and a thickness swelling rate at the end of the $1000^{th}$ cycle benchmarked against the first-cycle discharge capacity and the initial thickness of the battery cell.

The test results of Embodiments 1 to 7 and Comparative Embodiments 1 to 3 are shown in Table 1.

TABLE 1

| Serial number | Inter-layer spacing of second negative active material (nm) | Inter-layer spacing of first negative active material (nm) | Inter-layer spacing ratio between second negative active material and first negative active material | Rate performance (C-rate) under 25° C. | | $1000^{th}$-cycle capacity retention rate cycled at 25° C. | $1000^{th}$-cycle thickness swelling rate cycled at 25° C. | Active mass density of negative electrode plate (g/cc) |
| --- | --- | --- | --- | --- | --- | --- | --- | --- |
| | | | | 1 C. | 2 C. | | | |
| Embodiment 1 | 0.61 | 0.34 | 1.80 | 96.2% | 85.2% | 87.40% | 8.72% | 1.76 |
| Embodiment 2 | 0.55 | 0.36 | 1.50 | 96.4% | 85.4% | 88.24% | 8.04% | 1.76 |
| Embodiment 3 | 0.45 | 0.35 | 1.29 | 96.9% | 86.1% | 89.13% | 7.32% | 1.76 |
| Embodiment 4 | 0.44 | 0.37 | 1.19 | 97.2% | 86.5% | 90.32% | 6.40% | 1.76 |
| Embodiment 5 | 0.38 | 0.34 | 1.11 | 97.8% | 87.5% | 92.47% | 6.25% | 1.76 |
| Comparative Embodiment 1 | — | 0.34 | — | 95.3% | 83.9% | 83.67% | 11.94% | 1.80 |
| Comparative Embodiment 2 | — | 0.61 | — | 98.2% | 87.8% | 88.30% | 6.02% | 1.73 |
| Embodiment 6 | 0.43 | 0.42 | 1.02 | 96.1% | 84.3% | 84.45% | 10.80% | 1.76 |
| Embodiment 7 | 0.61 | 0.32 | 1.90 | 96.3% | 84.7% | 86.56% | 9.96% | 1.74 |
| Comparative Embodiment 3 | 0.34 | 0.38 | 0.89 | 95.3% | 84.6% | 84.53% | 9.62% | 1.76 | in Table 1. For details, see Table 1. In addition, the thickness of the cold-pressed negative electrode plate in Embodiments 6 to 7 and Comparative Embodiment 3 is 115.8 μm.

Performance Test (1) Testing the Rate Performance

Charging the battery under a temperature of 25° C. at a constant current until the voltage reaches 4.5 V, and then charging the battery at a constant voltage until the current reaches 0.02 C. Leaving the battery to stand for 5 minutes, and then discharging the battery at constant current rates of 0.2 C, 0.5 C, 1 C, 1.5 C, and 2 C separately. Recording the As can be seen from the parameter characteristics and test data in Table 1, the negative electrode plate coated with two active material layers disclosed herein includes: a first negative active material layer applied onto at least one surface of the negative current collector and located close to the negative current collector; and a second negative active material layer. The first negative active material layer is located between the second negative active material layer and the negative current collector. The first negative active material layer includes a first negative active material. The second negative active material layer includes a second negative active material. An interlayer spacing of the first negative active material is smaller than an interlayer spacing of the second negative active material.

On the one hand, the large interlayer spacing (that is, the interlayer spacing of the second negative active material layer) broadens the lithium ion diffusion channel and reserves a swelling space. On the other hand, the second negative active material layer with a large interlayer spacing is located in a superficial layer of the negative current collector. The larger the interlayer spacing of the superficial-layer graphite, the easier it is to deintercalate lithium ions from active sites in the graphite, and the lower the activation potential. Therefore, the battery achieves higher cycle performance and rate performance. In addition, the graphite is of an excellent ion-conducting porous structure, thereby further improving the kinetic performance of the battery.

A small interlayer spacing (that is, the interlayer spacing of the first negative active material layer) is used to compensate for the volumetric energy density loss of the battery caused by the low active mass density that accompanies the large interlayer spacing, thereby enhancing the cycle performance and rate performance of the battery without losing the volumetric energy density of the battery.

Specifically, in contrast to Embodiment 1, the negative electrode in Comparative Embodiments 1 and 2 employs a single active material layer in the prior art. The negative current collector in Comparative Embodiment 1 is coated with just one negative active material with a small interlayer spacing. As can be seen from the data in Table 1, the $1000^{th}$-cycle capacity retention rate in Comparative Embodiment 1 is as low as 83.67%, being lower than the $1000^{th}$-cycle capacity retention rate (87.40%) in Embodiment 1 by approximately 4%. Moreover, the $1000^{th}$-cycle thickness swelling rate of the battery cell in Comparative Embodiment 1 is as high as 11.94%, being much higher than the $1000^{th}$-cycle thickness swelling rate (8.72%) of the battery cell in Embodiment 1. Evidently, the large interlayer spacing improves the cycle capacity retention rate significantly, and reduces the thickness swelling rate of the battery cell significantly.

The negative current collector in Comparative Embodiment 2 is coated with just one negative active material with a large interlayer spacing. As can be seen from the data in Table 1, the $1000^{th}$-cycle capacity retention rate in Comparative Embodiment 2 is 88.30%, being slightly higher than the $1000^{th}$-cycle capacity retention rate (87.40%) in Embodiment 1. The $1000^{th}$-cycle thickness swelling rate of the battery cell in Comparative Embodiment 2 is 6.02%, being lower than the thickness swelling rate (8.72%) of the battery cell in Embodiment 1. However, as calculated, the active mass density in Comparative Embodiment 2 is as low as 1.73 g/cc, being much lower than 1.76 g/cc in Embodiment 1, thereby seriously impairing the volumetric energy density of the battery. Evidently, compared with the negative electrode plate that employs only one negative active material layer with a large interlayer spacing, the negative electrode plate that employs two negative active material layers according to this application achieves an improved trade-off between the volumetric energy density, the capacity retention rate, and the cycle swelling rate of the battery.

The interlayer spacing ratios of the negative active materials in the two active material layers in Embodiment 6 and Embodiment 7 are 1.02 and 1.90 respectively. As can be seen from the data in Table 1, in a case that the active mass density in Embodiments 6 and 7 is slightly lower, the cycle performance, rate performance, and anti-swelling performance are all higher than those in Comparative Embodiment 1. In addition, in a case that the cycle performance, rate performance, and anti-swelling performance are similar to those in Comparative Embodiment 2, the active mass density is significantly higher than that in Comparative Embodiment 2. Evidently, the negative electrode plate with two negative active material layers according to this application can achieve a good tradeoff between the active mass density, cycle performance, rate performance, and anti-swelling performance. However, as can be seen from the test data in Table 1, the rate performance, capacity retention rate, and thickness swelling rate in Embodiments 6 to 7 are inferior to those in Embodiment 1.

In Embodiments 3 to 5, the interlayer spacing ratio is further controlled to be in an appropriate range (for example, the interlayer spacing ratio is controlled to be 1.1 to 1.3), the graphite with an appropriate interlayer spacing (for example, the graphite with an interlayer spacing of 0.34 nm to 0.37 nm) is used as the first negative active material, and the graphite with another appropriate interlayer spacing (for example, the graphite with an interlayer spacing of 0.37 nm to 0.45 nm) is used as the second negative active material. Therefore, as can be seen from the test data in Table 1, in contrast to Embodiment 1, the 1 C rate performance in Embodiments 3 to 5 is 97% to 98%, being higher than that (96%) in Embodiment 1. The 2 C rate performance in Embodiments 3 to 5 is higher than 86%, being higher than that (85%) in Embodiment 1. In addition, the $1000^{th}$-cycle capacity retention rate in Embodiments 3 to 5 is 90% or so and can be up to 92.47% as a maximum, being higher than the $1000^{th}$-cycle capacity retention rate (87.4%) in Embodiment 1 by approximately 2% to 5%. Moreover, the $1000^{th}$-cycle thickness swelling rate of the battery cell in Embodiments 3 to 5 is not greater than 7.5% and can be down to 6.25%, being lower than the $1000^{th}$-cycle thickness swelling rate (8.72%) of the battery cell in Embodiment 1 by approximately 1.4% to 2.5%. Evidently, the appropriate interlayer spacing and the approximate interlayer spacing ratio are conducive to enhancing the capacity retention rate of the battery, reducing the capacity loss of the battery, and achieving an optimum of the rate performance, cycle life, and anti-swelling performance of the battery.

The interlayer spacing ratio between the second negative active material and the first negative active material in Comparative Embodiment 3 is 0.89. That is, the interlayer spacing of the negative active material located on the outer side of the negative electrode plate is smaller than the interlayer spacing of the negative active material located on the inner side of the negative electrode plate. As can be seen from the comparison between Comparative Embodiment 3 and Embodiment 5 in Table 1, under the condition that the active mass density of the negative electrode plate is the same, Comparative Embodiment 3 is much inferior to Embodiment 5 in terms of anti-swelling performance, cycle life, and rate performance. That is because the negative active material located on the outer side and possessing a small interlayer spacing hinders the deintercalation of lithium ions to some extent, and is prone to swell in volume, and therefore, lacks the advantages of the negative active material located on the inner side and possessing a large interlayer spacing in improving the rate performance, cycle performance, and anti-swelling performance.

The foregoing descriptions are merely exemplary embodiments of this application, but are not intended to limit this application. Any modifications, equivalent substitutions, and improvements made without departing from the spirit and principles of this application still fall within the protection scope of this application.

15

What is claimed is:

1. A negative electrode plate, comprising:

a negative current collector, a first negative active material layer, and a second negative active material layer;

in a thickness direction of the negative electrode plate, the first negative active material layer is located between the second negative active material layer and the negative current collector;

the first negative active material layer comprises a first negative active material;

the second negative active material layer comprises a second negative active material; and an interlayer spacing of the first negative active material is smaller than an interlayer spacing of the second negative active material, wherein the interlayer spacing of the first negative active material is in a range of 0.34 nm to 0.42 nm; and the interlayer spacing of the second negative active material is in a range of 0.37 nm to 0.61 nm, and a ratio of the interlayer spacing of the second negative active material to the interlayer spacing of the first negative active material falls within a range of 1.19 to 1.8.

2. The negative electrode plate according to claim 1, wherein the ratio of the interlayer spacing of the second negative active material to the interlayer spacing of the first negative active material falls within a range of 1.19 to 1.3.

3. The negative electrode plate according to claim 1, wherein the interlayer spacing of the first negative active material is in the range of 0.34 nm to 0.37 nm; and the interlayer spacing of the second negative active material is in the range of 0.37 nm to 0.45 nm.

4. The negative electrode plate according to claim 1, wherein an undercoat layer is applied onto the negative current collector.

5. The negative electrode plate according to claim 4, wherein the undercoat layer comprises at least one of conductive carbon, carbon nanotubes, or graphene.

6. The negative electrode plate according to claim 1, wherein the first negative active material and the second negative active material each are one independently selected from the group consisting of soft carbon, hard carbon, artificial graphite, and natural graphite.

7. A battery cell, comprising a positive electrode plate, a separator, and a negative electrode plate; and the negative electrode plate is the negative electrode plate according to claim 1.

8. The battery cell according to claim 7, wherein the ratio of the interlayer spacing of the second negative active material to the interlayer spacing of the first negative active material falls within a range of 1.19 to 1.3.

9. The battery cell according to claim 7, wherein the interlayer spacing of the first negative active material is in the range of 0.34 nm to 0.37 nm; and the interlayer spacing of the second negative active material is in the range of 0.37 nm to 0.45 nm.

10. The battery cell according to claim 7, wherein an undercoat layer is applied onto the negative current collector.

11. The battery cell according to claim 10, wherein the undercoat layer comprises at least one of conductive carbon, carbon nanotubes, or graphene.

12. The battery cell according to claim 7, wherein the first negative active material and the second negative active material each are one independently selected from the group consisting of soft carbon, hard carbon, artificial graphite, andnatural graphite.

13. A battery, comprising the battery cell according to claim 7.

14. The battery according to claim 13, wherein the ratio of the interlayer spacing of the second negative active material to the interlayer spacing of the first negative active material falls within a range of 1.19 to 1.3.

* * * * *